US006192299B1

(12) United States Patent
Kubota et al.

(10) Patent No.: US 6,192,299 B1
(45) Date of Patent: Feb. 20, 2001

(54) METHOD OF MEASURING OPERATION CHARACTERISTIC OF PROPORTIONAL ELECTROMAGNETIC CONTROL VALVE, METHOD OF CONTROLLING OPERATION OF HYDRAULIC CYLINDER, AND METHOD OF MODIFYING OPERATION CHARACTERISTIC OF PROPORTIONAL ELECTROMAGNETIC CONTROL VALVE

(75) Inventors: Koji Kubota; Masaaki Ikarashi; Satoshi Miyagawa, all of Aichi-ken (JP)

(73) Assignee: Mitsubushi Heavy Industries, Ltd., Tokyo (JP)

( * ) Notice: Under 35 U.S.C. 154(b), the term of this patent shall be extended for 0 days.

(21) Appl. No.: 09/021,414

(22) Filed: Feb. 10, 1998

(30) Foreign Application Priority Data

Feb. 19, 1997 (JP) .................................. 9-035160

(51) Int. Cl.[7] ...................................... G05D 7/06
(52) U.S. Cl. .................... 700/282; 700/204; 700/301; 700/304; 702/96; 702/98
(58) Field of Search .................. 700/282, 301, 700/304, 197, 200, 203, 204; 702/94, 96, 97, 98, 138, 149

(56) References Cited

U.S. PATENT DOCUMENTS

| 3,626,384 | * | 12/1971 | Davis ................... 702/195 |
| 4,720,807 | * | 1/1988 | Ferran et al. ........... 700/282 |
| 4,734,869 | * | 3/1988 | Mickowski ............. 702/183 |
| 5,040,126 | * | 8/1991 | Allington .................. 702/47 |
| 5,595,693 | * | 1/1997 | Fujita et al. ........... 264/40.1 |
| 5,916,501 | * | 6/1999 | Hehl ....................... 264/40.1 |
| 5,918,195 | * | 6/1999 | Halgrimson et al. ....... 702/94 |
| 6,108,587 | * | 8/2000 | Shearer et al. ........... 700/200 |

FOREIGN PATENT DOCUMENTS

| WO 97/02940 | * | 1/1997 | (DE) | ................... B29C/45/76 |
| 64-9177 | | 2/1989 | (JP) . | |
| 5-57777 | | 3/1993 | (JP) . | |
| 6-281043 | | 10/1994 | (JP) . | |

OTHER PUBLICATIONS

Translations of parts of Backe, W.; Grundiagen und Entwickiungstendenzen in der Ventiltechnik, in: o + p, Olhydraulik und Pneumatik, 34 (1990), pp. 498–504.
Translation of passages of reference Edelmann, H.: Schneile Proportionalventile und ihre Anwendung, in: o + p, Olhydraulik und Pneumatik 30 (1986) pp. 35–40.

* cited by examiner

*Primary Examiner*—William Grant
*Assistant Examiner*—Paul Rodriguez
(74) *Attorney, Agent, or Firm*—Armstrong, Westerman, Hattori, McLeland & Naughton (57) ABSTRACT

A method by which an operation characteristic of a proportional electromagnetic control valve can be automatically measured in a short period of time. For this purpose, in the operation characteristic measuring method of the present invention, when the proportional electromagnetic control valve to be measured is a proportional electromagnetic pressure control valve, at each step for measuring a pressure of a hydraulic circuit, the pressure is measured with a predetermined interval of time, the pressure is assumed to be stabilized at a point of time when a difference $\Delta P$ between the measured pressure value and the previously measured pressure value becomes a predeterminied level or less, and the measured pressure value at this point of time is employed as a pressure corresponding to a load current at this step. The present invention is used at the time when an injection molding machine is inspected at its manufacturing site upon shipping and at the time when the injection molding machine is controlled while being actually operated.

7 Claims, 5 Drawing Sheets

MEASURE TIME t FOR TRAVELING
PREDETERMINED DISTANCE

FIG. 3A
PRIOR ART m : APPROACH DISTANCE (CONSTANT)
$l_0$ : PREDETERMIND DISTANCE

MEASURE DISTANCE OF TRAVEL IN
PREDETERMINED TIME to

METHOD OF MEASURING OPERATION CHARACTERISTIC OF PROPORTIONAL ELECTROMAGNETIC CONTROL VALVE, METHOD OF CONTROLLING OPERATION OF HYDRAULIC CYLINDER, AND METHOD OF MODIFYING OPERATION CHARACTERISTIC OF PROPORTIONAL ELECTROMAGNETIC CONTROL VALVE

BACKGROUND OF THE INVENTION

1) Field of the Invention

This invention relates to a method of actually measuring a pressure-current characteristic as an operation characteristic of a proportional electromagnetic control valve in a hydraulic circuit or a velocity-current characteristic of a hydraulic cylinder; a method of controlling, based on thus measured result, an operation state of the hydraulic cylinder; and a method of modifying a prestored operation characteristic. In particular, the present invention relates to a method of measuring an operation characteristic of a proportional electromagnetic control valve, a method of controlling an operation of a hydraulic cylinder, and a method of modifying an operation characteristic of the proportional valve which are suitably used when an injection molding machine is inspected at its manufacturing site upon shipping or when the injection molding machine is controlled while being actually operated.

2) Description of the Related Art

In an injection molding machine, while a hydraulic pressure from a hydraulic pump or accumulator is supplied to a hydraulic cylinder (injection cylinder, closing cylinder, nozzle tcuch cylinder, or the like) via a proportional electromagnetic control valve (proportional electromagnetic flow control valve or proportional electromagnetic pressure control valve) so as to control velocity or pressure, such a proportional electromagnetic control valve yields a large fluctuation in its characteristic in general.

Consequently, prior to shipment of an injection molding machine, its hydraulic circuit is operated in the actual machine, several points of pressure levels or flow levels of its proportional electromagnetic control valve with respect to its load current are measured, thus measured levels are compared with a reference characteristic attached to the proportional electromagnetic control valve, and the gain of the load current output circuit for the proportional electromagnetic control valve is manually adjusted before shipping. Inmost cases, however, only the maximum and minimum levels are measured for output current adjustment and, also under the influence of differences among machines and circuit configurations, thus modified characteristic may not have a high accuracy.

Japanese Patent Publication No. SHO 64-9177 discloses a technique in which, in order to enhance accuracy of an actually employed characteristic, the characteristic of a proportional electromagnetic control valve built in an injection molding machine is actually measured before shipping its hardware, a correction characteristic table providing a relationship between an ordered level and an output level is prepared according to the measured result, and the proportional electromagnetic valve is controlled with reference to the contents of this correction characteristic table upon actually operating the hardware.

In the characteristic auto-modifying technique for a proportional electromagnetic control valve disclosed in the above-mentioned publication, the proportional electromagnetic control valve is operated with its input levels successively changing from the minimum input level to maximum input level so that their corresponding numeral output levels are initially measured and, according to a result of a comprehended relationship between these numerous actually measured levels and their corresponding ordered levels, the correction characteristic table is prepared such that the output level is proportional to the input level.

In such a technique for measuring the characteristic of a proportional electromagnetic control valve, while numerous points from the minimum input level to the maximum input level are actually measured and plotted when preparing the correction characteristic table, there may be cases where, due to the condition under which a hydraulic cylinder is used and the like, the maximum pressure or maximum velocity cannot be attained in the state where the proportional electromagnetic control valve is built in the machine. In such a case, the characteristic of the proportional electromagnetic valve cannot be modified. Also, the number of measuring points may be so large that an enormous amount of labor and time is necessitated.

Theretfore, Japanese Patent Application Laid-Open (Kokai) No. HEI 5-57777 discloses a technique in which reference characteristic curve data of a proportional electromagnetic control valve of the same type as that of the proportional electromagnetic control valve built in the machine are prestored in a storage circuit in a microcomputer in a control unit of the injection molding machine, the microcomputer causes the proportional electromagnetic control valve to operate (in a test run) by given ordered levels at predetermined two points, output (pressure or velocity) levels corresponding thereto are respectively measured, and then, according to the two points of ordered levels and output levels obtained by the test run and the above-mentioned reference characteristic curve data, output levels corresponding to individual points on the reference characteristic curve are successively computed to recompose the characteristic curve.

In the technique in which the actually measured level and the reference characteristic table attached to the proportional electromagnetic control valve are compared with each other, and the maximum and minimum levels are regulated by gain adjustment of a load current output circuit amplifier of the proportional electromagnetic control valve so as to modify characteristic levels of the proportional electromagnetic control valve, as mentioned above, however, data of proportional electromagnetic control valve differ among different machines and, also under the influence of differences in circuit configurations, a linearity may not be obtained between the ordered and executed levels, thus deteriorating the accuracy of the modified characteristic.

In the technique in which a characteristic is actually measured, a correction characteristic table keeping a relationship between ordered and output levels is prepared, and a correction characteristic is added so as to control the proportional electromagnetic control valve as disclosed in Japanese Patent Publication No. 64-9177, numerous points from the minimum input level to maximum input level must be actually measured to prepare the correction characteristic table as mentioned above. Here, since the number of measured points is large, an enormous amount of labor and time is necessary.

In the method disclosed in Japanese Patent Application Laid-Open (Kokai) No. HEI 5-57777 in which characteristic data of the proportional electromagnetic control valve are obtained on the analogy of two points of data, correct data may not be obtained from the two points alone since the original data are a curve constituted by a polynomial function.

In the foregoing method in which a data table is retrieved, an accurate resolution as fine as 0.1% cannot be obtained.

In the conventional pressure measurement in an actual hydraulic circuit, in the case where pressure is relatively low, the pressure is measured after a rising overshoot upon switching hydraulic pressure is suppressed. When the number of measuring points is large, however, it takes much time therefor. When measuring velocity, since time by which a predetermined position travels a predetermined distance is measured to determine the velocity. Accordingly, it takes much time for measurement at the minimum velocity, and an enormous amount of time is required for measuring numerous points.

SUMMARY OF THE INVENTION

In view of such problems, it is a first object of the present invention to provide a method of measuring an operation characteristic of a proportional electromagnetic control valve, which allows the operation characteristic to be automatically measured in a short period of time, thus shortening the time required for inspection upon shipment.

It is a second object of the present invention to provide a method of controlling an operation of a hydraulic cylinder, which allows the hydraulic cylinder to be controlled constantly at a high accuracy according to the automatically measured operation characteristic.

It is a third object of the present invention to provide a method of modifying an operation characteristic of a proportional electromagnetic control valve, which allows an operation characteristic kept in a memory to be automatically modified after shipping the machine, so that the operation characteristic matching the present state can always be maintained.

In order to achieve the above-mentioned objects, the method of measuring an operation characteristic of a proportional electromagnetic control valve in accordance with the present invention is, in a hydraulic circuit in which a hydraulic cylinder is operated as a proportional electromagnetic control valve which adjusts hydraulic pressure and flow rate, when the proportional electromagnetic control valve is a proportional electromagnetic pressure control valve which controls a hydraulic pressure in response to a load current, a method of measuring a pressure-current characteristic as the operation characteristic of the proportional electromagnetic pressure control valve by successively changing the load current with respect to the proportional electromagnetic pressure control valve stepwise and measuring a pressure of the hydraulic circuit corresponding to the load current at each step in a closed operation state of the hydraulic circuit; wherein, at each step for measuring the pressure of the hydraulic circuit, the pressure is measured at a predetermined interval of time, the pressure is assumed to be stabilized at a point of time when a difference between the measured pressure value and the previously measured pressure value becomes a predetermined level or smaller, and the measured pressure value at this point of time is employed as the pressure corresponding to the load current at this step.

In the method of measuring an operation characteristic of a proportional electromagnetic control valve in accordance with the present invention mentioned above, even in the case where pressure is relatively low, a pressure obtained when the inclination of a declining curve of rising overshoot upon switching hydraulic pressure becomes a predetermined level or smaller is employed as the measured value, whereby the measurement time can be shortened. Accordingly, even when numerous points are measured, the period of time for measuring the operation characteristic can be reduced, thus allowing the time required for the inspection upon shipping or the like to greatly decrease.

Also, the method of measuring an operation characteristic of a proportional electromagnetic control valve in accordance with the present invention is, in a hydraulic circuit in which a hydraulic cylinder is operated as a proportional electromagnetic control valve adjusts hydraulic pressure and flow rate, when the proportional electromagnetic control valve is a proportional electromagnetic flow control valve which controls a flow rate in response to a load current, a method of measuring a velocity-current characteristic as the operation characteristic of the proportional electromagnetic flow control valve by causing the hydraulic cylinder to attain an operable state, successively changing the load current with respect to the proportional electromagnetic flow control valve stepwise so as to operate the hydraulic cylinder, and computing a velocity of a hydraulic ram of the hydraulic cylinder corresponding to the load current at each step; wherein, at each step for computing the velocity of the hydraulic ram, a traveling distance of the hydraulic ram by a predetermined period of time is measured, and a velocity computed according to the traveling distance is employed as the velocity corresponding to the load current at this step.

In the above-men-ioned method of measuring an operation characteristic of a proportional electromagnetic control valve in accordance with the present invention, the traveling distance for a predetermined time is measured so as to determine the velocity, thus allowing the measuring time to become shorter as compared with the conventional method, in particular, on the minimum velocity side. Accordingly, even when numerous points are measured, the period of time for measuring the operation characteristic can be reduced, thus allowing the time required for the inspection upon shipping or the like to greatly decrease.

The method of controlling an operation of a hydraulic cylinder in accordance with the present invention is a method of controlling an operation state of the hydraulic cylinder by adjusting hydraulic pressure and flow rate by a hydraulic circuit having a proportional electromagnetic control valve; wherein an operation characteristic of the proportional electromagnetic control valve is measured by one of the above-mentioned two methods of measuring an operation characteristic of a proportional electromagnetic control valve and is stored into a memory and, when specifying a hydraulic pressure to the hydraulic cylinder or a velocity of the hydraulic ram of the hydraulic cylinder, an operation characteristic value matching thus specified level is read out from the memory and is converted into an executive current, which is then applied to the proportional electromagnetic control valve so as to control the operation state of the hydraulic cylinder.

In the above-mentioned method of controlling an operation of a hydraulic cylinder in accordance with the present invention, when the hydraulic pressure of the hydraulic cylinder or the velocity of the hydraulic ram is specified at the time of actual operation, the current characteristic value matching thus specified level is read out from the memory and is converted into an executive current so as to be applied to the proportional electromagnetic control valve, whereby the operation state of the hydraulic cylinder is controlled. Therefore, according to the automatically measured operation characteristic, the hydraulic cylinder can be always controlled with a high accuracy.

Also, the method of controlling an operation of a hydraulic cylinder in accordance with the present invention is a method of controlling an operation state of the hydraulic cylinder by adjusting hydraulic pressure and flow rate by a hydraulic circuit having a proportional electromagnetic control valve; wherein an operation characteristic of the proportional electromagnetic control valve is measured by one of the above-mentioned two methods of measuring an operation characteristic of a proportional electromagnetic control valve and is stored in a memory, a table for relating a load current level to the measured operation characteristic value at each step is prepared, interpolation is performed between points plotted on the table so as to determine a continuous function, which is then stored into a memory as the operation characteristic of the proportional electromagnetic control valve, the function is read out from the memory upon actual operation of the hydraulic cylinder, an executive current level is computed according to the function and a target level for hydraulic pressure to the hydraulic cylinder or velocity of a hydraulic ram of the hydraulic cylinder, and a current corresponding to the executive current level is applied to the proportional electromagnetic control valve so as to control the operation state of the hydraulic cylinder.

In the method of controlling an operation of a hydraulic cylinder in accordance with the present invention, the operation characteristic stored in the memory as a function is automatically modified and rewritten in response to a request for automatic modification. Consequently, even when the proportional electromagnetic control valve built in the hydraulic circuit or functional parts relating to hydraulic pressure or flow rate are repaired or exchanged, the operation characteristic of the proportional electromagnetic control valve stored in the memory can be automatically modified while the machine is kept installed as it is, and the hydraulic cylinder can always be controlled with a high accuracy according to thus automatically modified operation characteristic.

Further, the method of modifying an operation characteristic of a proportional electromagnetic control valve in accordance with the present invention is, when, in order to control an operation state of a hydraulic cylinder by adjusting hydraulic pressure and flow rate by a hydraulic circuit having a proportional electromagnetic control valve, an operation characteristic value corresponding to a load current level of the proportional electromagnetic control valve is prestored into a memory as a characteristic curve, a method of modifying the characteristic curve stored in the memory; wherein a hydraulic pressure or flow rate of the hydraulic circuit is specified, a load current level of the proportional electromagnetic control valve corresponding to thus specified level is read out from the characteristic curve in the memory, a current corresponding to thus read-out load current level is applied to the proportional electromagnetic control valve, the pressure or flow rate of the hydraulic circuit corresponding to this current is actually measured, a load current level of the proportional electromagnetic control valve corresponding to thus actually measured value is read out from the characteristic curve in the memory, a difference between thus obtained load current level and an initial load current level is added to or subtracted from the initial load current level, and a current level resulting from this adding or subtracting operation is written into the memory as a modified load current level corresponding to the specified level so as to modify the load current level of the characteristic curve in the memory.

In the above-mentioned method of modifying an operation characteristic of a proportional electromagnetic control valve in accordance with the present invention, in the case where an operation characteristic value corresponding to the load current level of the proportional electromagnetic control valve is prestored in the memory as a characteristic curve, the characteristic curve (operation characteristic) can be automatically modified after shipping the machine. Accordingly, even when the proportional electromagnetic control valve built in the hydraulic circuit or functional parts relating to hydraulic pressure or flow rate are repaired or exchanged, the operation characteristic corresponding to the current state can always be held in the memory while the machine is kept installed as it is.

DESCRIPTION OF THE PREFERRED EMBODIMENTS

In the following, an embodiment of the present invention will be explained with reference to the accompanying drawings.

Explained in this embodiment is a case where the present invention is applied to a hydraulic operation control circuit for an injection molding machine, which comprises a hydraulic pump, a switching valve, and the like, and adjusts hydraulic pressure and flow rate so as to operate the hydraulic cylinder, as will be explained later, thereby performing a closing operation, injection of melted resin, and the like.

Figure 4:
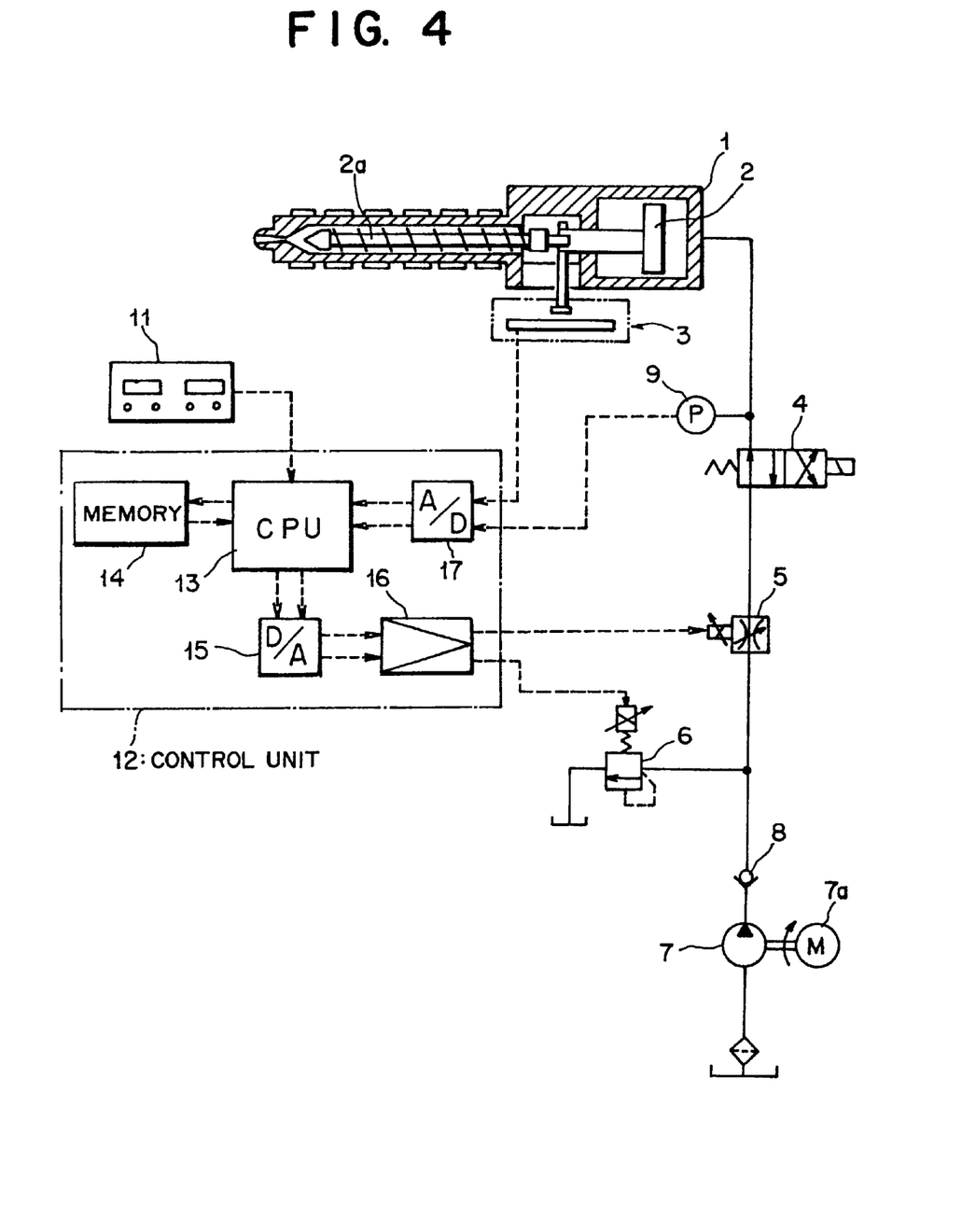
FIG. 4 is a view showing a configuration of the hydraulic circuit and control system in an injection molding machine in accordance with this embodiment.

First, with reference to FIG. 4, the configuration of the hydraulic circuit and control system of the injection molding machine to which the method of the present invention is applied will be explained. Depicted in FIG. 4 are an injection cylinder (hydraulic cylinder) 1 of the injection molding machine whose operation is to be controlled in this embodiment, an injection ram (hydraulic ram) 2 within the injection cylinder 1, and an injection screw 2a connected to the injection ram 2.

Also depicted are a position sensor 3 for detecting an amount of movement of the injection ram 2, a direction-switching valve 4 for turning on/off an injecting operation of the injection cylinder 1, a proportional electromagnetic flow control valve (proportional electromagnetic control valve) 5 for controlling the flow rate of a hydraulic operating fluid to the injection cylinder 1 in response to a load current from a control unit 12, a proportional electromagnetic pressure control valve (proportional electromagnetic control valve) 6 for controlling the pressure of the hydraulic operating fluid in response to a load current from the control unit 12, a continuous flow pump 7 which is driven by a motor (M) 7a so as to rotate at a predetermined rpm, a check valve 8, and a pressure sensor 9 for detecting pressure in this hydraulic circuit.

The above-mentioned direction-switching valve 4, control valves 5 and 6, pump 7, check valve 8, and the like constitute the hydraulic circuit for operating the injection cylinder 1 at an injecting process caused by the injection screw 2a.

On the other hand, provided are an operation panel 11 for setting and inputting various kinds of information such as specified levels (control target levels) for pressure of the hydraulic circuit, velocity of the injection ram 2 (flow rate of the hydraulic circuit), and the like to the control unit 12 explained later, and the control unit 12, which receives signals from the position sensor 3 and pressure sensor 9 and applies a load current to each of the control valves 5 and 6 so as to control the hydraulic circuit, thereby controlling the operation state of the injection cylinder 1. The control unit 12 is constituted by, in addition to a CPU 13 as an arithmetic processing unit, a memory 14, a D/A converter 15, an output amplifier 16, and an A/D converter 17 which are built therein.

Here, the CPU 13 actually controls an operation state of the injection cylinder 1 in addition to measuring/modifying operation characteristics of the control valves 5 and 6, which will be explained later; whereas the memory 14 stores the operation characteristics of the control valves 5 and 6, as will be explained later.

On the other hand, the D/A converter 15 converts, from digital to analog, control signals (load current level signals) sent from the CPU 13 for the respective control valves 5 and 6. The amplifier (output amplifier) 16 amplifies the control signals from the D/A converter 15 and outputs the amplified signals to their corresponding control valves 5 and 6. The A/D converter 17 converts analog detection signals from the position sensor 3 and pressure sensor 9 into digital signals and outputs thus converted signals to the CPU 13.

Figure 1:
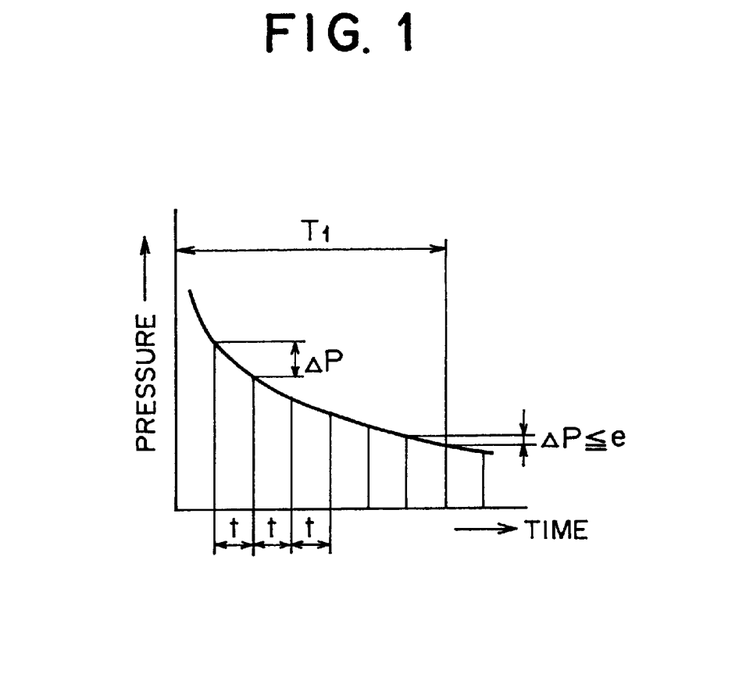
FIG. 1 is a view for explaining a method of measuring an operation characteristic of a proportional electromagnetic pressure control valve in accordance with one embodiment of the present invention.
Figure 2:
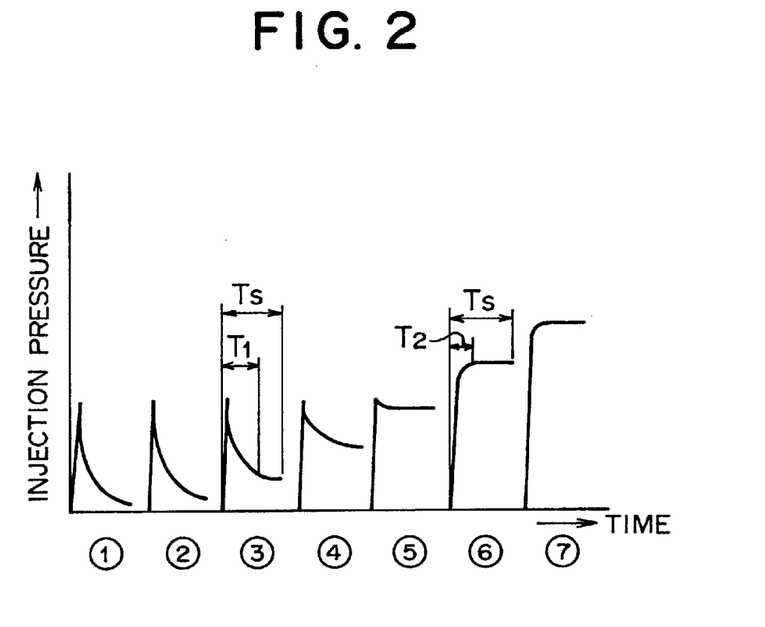
FIG. 2 is a graph showing a rising state of hydraulic pressure in a hydraulic circuit of this embodiment.
Figure 3A:
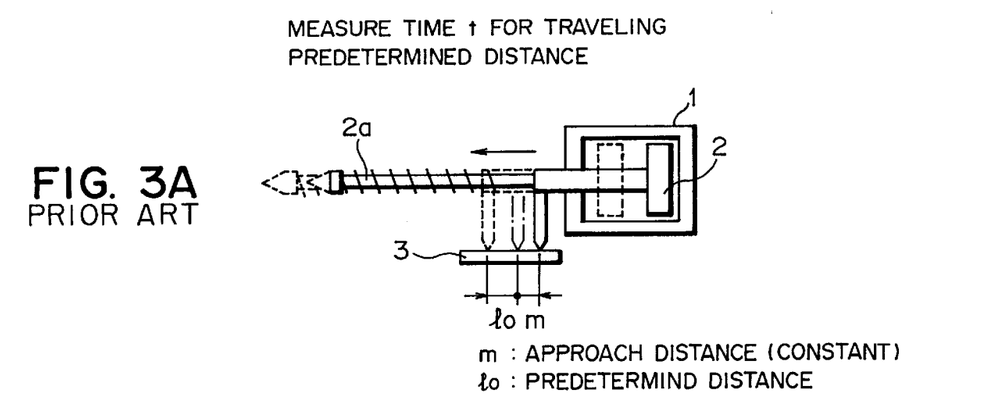
FIG. 3A is a lateral sectional view schematically showing an injection cylinder in order to explain a technique for measuring velocity of a conventional injection ram.
Figure 3B:
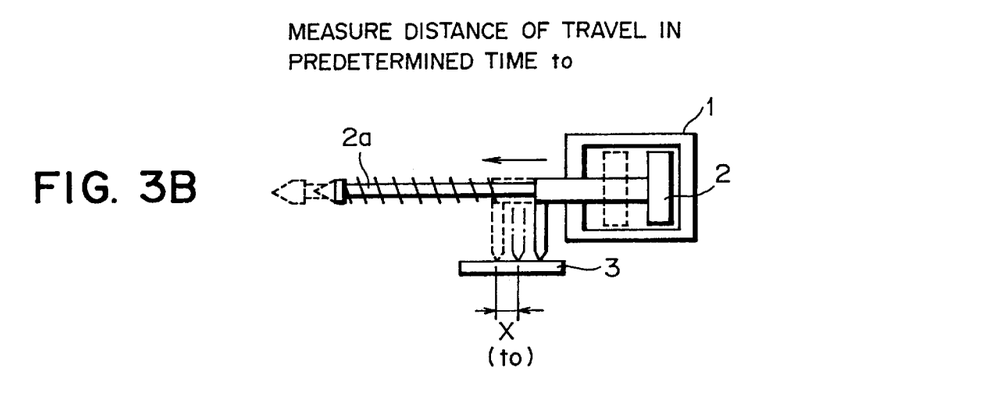
FIG. 3B is a lateral sectional view schematically showing an injection cylinder in order to explain a method of measuring an operation characteristic of a proportional electromagnetic flow control valve (technique for measuring velocity of an injection ram) in this embodiment.

Explained in the following with reference to FIGS. 1 to 3 is a method of automatically inspecting, in a working manner, a pressure-current characteristic (operation characteristic) of the proportional electromagnetic pressure control valve 6 or the relationship between velocity of the injection cylinder 1 and the load current level to the proportional electromagnetic flow control valve 5 [a velocity-current characteristic of the injection cylinder 1, and an operation characteristic (flow rate-current characteristic) of the proportional electromagnetic flow control valve 5] when the injection molding machine equipped with the hydraulic circuit and control unit 12 of this embodiment constructed, as mentioned above, is inspected upon shipment in he site where the machine is manufactured.

FIG. 2 is a graph showing a rising state of hydraulic pressure in the hydraulic circuit of this embodiment. It illustrates a result obtained when, in this embodiment, the hydraulic pump 7 is driven, the injection cylinder 1 is operated under hydraulic pressure, the injection ram 2 of the injection cylinder 1 in the actual machine is pressed into the end portion of the stroke for closing, melted resin injection, and the like such that the hydraulic circuit attains a closed state, the load current with respect to the proportional electromagnetic pressure control valve 6 is successively changed stepwise, and the pressure of the hydraulic circuit is measured by the pressure sensor 9.

As shown in FIG. 2, in a low pressure band (Nos. 1 to 4), an overshoot occurs in each step of measurement, and then pressure gradually converges at the set pressure. Since it takes a certain time for pressure to stabilize, a delay timer has conventionally been provided (see Ts in FIG. 2 for its set level) to retard the pressure measuring timing. In such a measuring technique, however, the measuring timing uniformly delays even in the case where the set pressure is so high that pressure stabilizes in a short time, whereby it takes an enormous amount of time to measure pressure (measure an operation characteristic).

For measuring pressure in order to measure an operation characteristic in this embodiment, upon measuring one step of pressure, as shown in the pressure-declining curve after overshoot represented in FIG. 1, pressure is repeatedly measured by the pressure sensor 9 at a constant time interval t, the CPU 13 of the control unit 12 assumes pressure to be stabilized when a difference $\Delta P$ between the measured value and the previously measured value becomes a sufficiently small constant numerical value e or less, and this pressure is taken in as an operation pressure of the proportional electromagnetic pressure control valve 6 corresponding to the load current at this step.

Consequently, without necessitating a certain wait time Ts for each measurement step before measurement as in the conventional case, measurement is effected with a timing at which pressure is assumed to be stabilized for each measurement step. Therefore, the pressure measurement time requires only $T_1$, thus allowing the operation pressure in the next step to be measured after the time $T_1$ is elapsed. Thus, the total time required for preparing a pressure-current characteristic curve in the CPU 13 of the control unit 12 can be made much shorter than that in the conventional case.

Here, as shown in FIG. 2, overshoot hardly occurs in a high pressure band (Nos. 5 to 7). Even in such a case, in the measuring method of this embodiment, it is unnecessary to wait for the certain time Ts before measurement in each measurement step, as mentioned above, whereby measurement is effected with a timing $T_2$ at which pressure is assumed to be stabilized.

Meanwhile, FIG. 3A is a lateral sectional view schematically showing the injection cylinder 1 for explaining a conventional technique for measuring velocity of the injection ram 2; whereas FIG. 3B is a lateral sectional view schematically showing the injection cylinder 1 for explaining a method or measuring an operation characteristic of he proportional electromagnetic flow control valve 5 (technique for measuring velocity of the injection ram 2) in this embodiment.

When measuring an operation characteristic of the proportional electromagnetic flow control valve 5, while the injection cylinder 1 of the actual machine is set to an operable state, the load current to the proportional electromagnetic flow control valve 5 is successively changed stepwise, and the velocity of the injection ram 2 is measured while the injection cylinder 1 is caused to operate.

Here, in the conventional technique shown in FIG. 3A, a time t by which the injection ram 2 travels a predetermined distance $1_O$ is measured so as to compute a velocity $1_O/t$. In this embodiment, by contrast, as shown in FIG. 3B, a distance x by which the injection ram 2 travels in a predetermined time $t_O$ is precisely measured by means of the position sensor 3 and is fed into the CPU 13 of the control unit 12, whereby the velocity of the injection ram 2 is computed as $x/t_O$. Then, the CPU 13 multiplies thus measured and computed velocity of the injection ram (hydraulic ram) 2 by the pressure-receiving area of the injection cylinder 1 so as to compute a flow rate, and causes it to correspond to the load current at each step, thereby forming a characteristic curve concerning the flow rate-current characteristic of the proportional electromagnetic flow control valve 5.

In the conventional technique shown in FIG. 3A, concerning the time for traveling an approach distance m and the measurement distance $1_o$, in particular when the current of the proportional electromagnetic flow control valve 5 is low (flow rate is low), not only the measurement time becomes longer, but also the time required for the hydraulic ram 2 to return becomes longer. In the technique of the embodiment shown in FIG. 3B, by contrast, when the approach time and measurement time are respectively set to 0.5 second and 1.5 seconds beforehand, for example, the measurement time is always constant whether the current of the proportional electromagnetic flow control valve 5 is high or low, thus allowing the measurement to be completed in much shorter time than in the conventional technique shown in FIG. 3A.

In this embodiment, according to the data measured by such a technique as that mentioned above, characteristic curves for the proportional electromagnetic flow control valve 5 and proportional electromagnetic pressure control valve 6 are prepared, and thus prepared characteristic curves are stored in the memory 14 of the control unit 12. In the case where such a characteristic curve has already been stored in the memory 14, the characteristic curve in thememory 14 is rewritten ormodifiedbythe characteristic curve prepared by the above-mentioned technique.

When the operating hydraulic pressure of the injection cylinder 1 or velocity of the injection ram 2 in the injection molding machine is specified upon actual adriving, the CPU 13 of the control unit 12 reads out a current characteristic level corresponding to thus specified value from the memory 14, converts thus read-out level to an executive current, and applies this current to the proportional electromagnetic flow control valve 5 and proportional electromagnetic pressure control valve 6 via the D/A converter 15 and amplifier 16. As a result, the operation state of the injection cylinder 1 is controlled so as to attain the specified value.

In the following, explanation will be provided for a method of modifying the pressure-current characteristic of the proportional electromagnetic pressure control valve 6 or flow rate-current characteristic of the proportional electromagnetic flow control valve 5 thus written in the memory 14. This embodiment encompasses two kinds of modifying method. First and second examples thereof will be respectively explained with reference to FIGS. 5 and 6.

Figure 5:
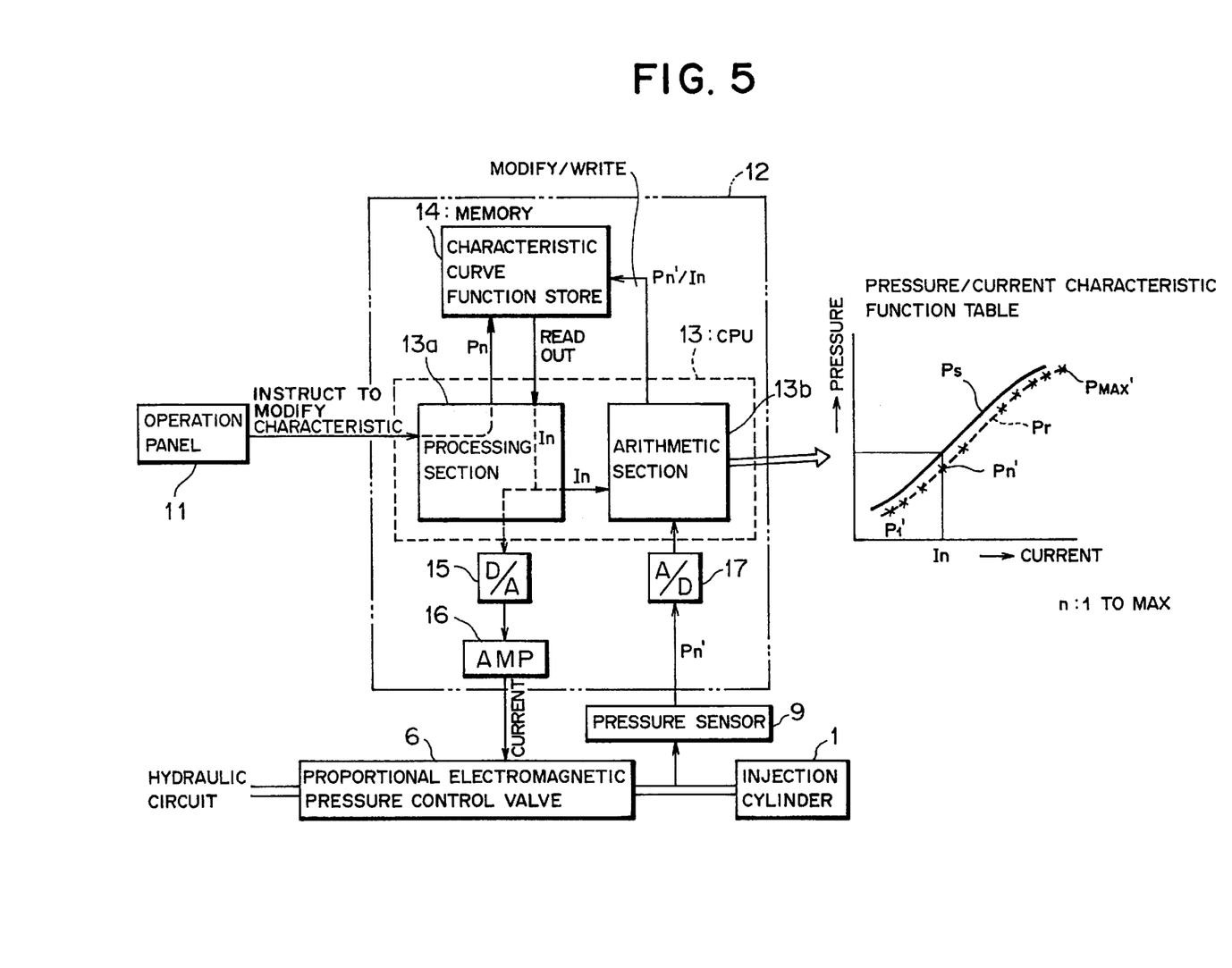
FIG. 5 is a block diagram functionally showing a detailed configuration of the hydraulic circuit and control system in order to explain a method of controlling an operation of an injection cylinder (method of modifying an operation characteristic of a proportional electromagnetic pressure control valve) in this embodiment.

FIG. 5 is a block diagram functionally showing a detailed configuration of the hydraulic circuit and control system in order to explain a method of controlling an operation of the injection cylinder 1 (method of modifying an operation characteristic of the proportional electromagnetic pressure control valve 6) in this embodiment. This process will be explained in detail with reference to FIG. 5, additionally in view of the modifying and rewriting function for the pressure characteristic in the proportional electromagnetic pressure control valve 6 in the hydraulic circuit shown in FIG. 4.

(1) When a request for automatically modifying the pressure characteristic is issued from the operation panel 11 to the CPU 13 a pressure-specifying level Pn stored in a memory (not depicted) built in a processing section 13a of the CPU 13 is sent to the memory 14, and a load current level In corresponding to the pressure-specifying level Pn is read out from a reference curve Ps of a pressure-current characteristic function table stored in the memory 14 to the processing section 13a of the CPU 13 so as to be temporarily kept there.

(2) According to a current (which corresponds to the current level In) outputted from the processing section 13a of the CPU 13 via the D/A converter 15 and amplifier 16, the proportional electromagnetic pressure control valve 6 is operated, whereby the pressure of the hydraulic circuit for driving the injection cylinder 1 is controlled. Then, an actual pressure Pn' of the hydraulic circuit is measured by the pressure sensor 9, and thus measured signal is sent to an arithmetic section 13b of the CPU 13 by way of the A/D converter 17. Here, the actual pressure Pn' is measured by the technique previously explained with reference to FIG. 1.

(3) In the arithmetic section 13b of the CPU 13, according to the actual pressure Pn' and the load current level In kept in the processing section 13a of the CPU 13 in the above-mentioned step (1), the actual pressure Pn' is plotted on the pressure-current characteristic function table.

(4) As explained above as represented by the pressure-specifying level Pn, pressure-specifying levels $P_1$ to $P_{MAX}$ are successively fed to the memory 14, current levels $I_1$ to $I_{MAX}$ respectively corresponding to the pressure-specifying levels are read out from the characteristic curve Ps of the pressure-current characteristic function table in the memory 14 to the processing section 13a of the CPU 13 so as to be temporarily kept there, actual pressures $P_1'$ to $P_{MAX}'$ of the hydraulic pressure are fed to the arithmetic section 13b of the CPU 13 and successively plotted on the pressure-current characteristic function table, and interpolation is made between thus plotted points, thereby yielding a continuous actual pressure characteristic curve Pr as shown in FIG. 5. Since this characteristic curve Pr has a form analogous to that of the characteristic curve Ps in the initial reference characteristic function table, the constant of function concerning the characteristic curve Ps is modified so that the new characteristic curve Pr is adopted as the function.

(5) In place of the function of the initial reference characteristic function table, the new characteristic curve Pr is written into the memory 14 as a function, so as to be ready for actual operation. When controlling actual operation, the CPU 13 uses the new function so as to determine a load current level of the proportional electromagnetic pressure control valve 6 corresponding to an arbitrary pressure-specifying level. Namely, a target pressure or target ram velocity is set from the operation panel 11 so as to be transmitted to the CPU 13 of the control unit 12; whereas the CPU 13 reads out the above-mentioned function from the memory 14, computes a load current level corresponding to the target level according to the function, and outputs a current corresponding to thus computed result via the D/A converter 15 and amplifier 16, thus operating and controlling the proportional electromagnetic pressure control valve 6 and proportional electromagnetic flow control valve 5.

While a method of modifying an operation characteristic applied to the proportional electromagnetic pressure control valve 6 is explained as an example in the foregoing, a technique similar to that mentioned above is applied to a case where an operation characteristic (flow rate-current characteristic) of the proportional electromagnetic flow control valve 5 is to be modified.

Figure 6:
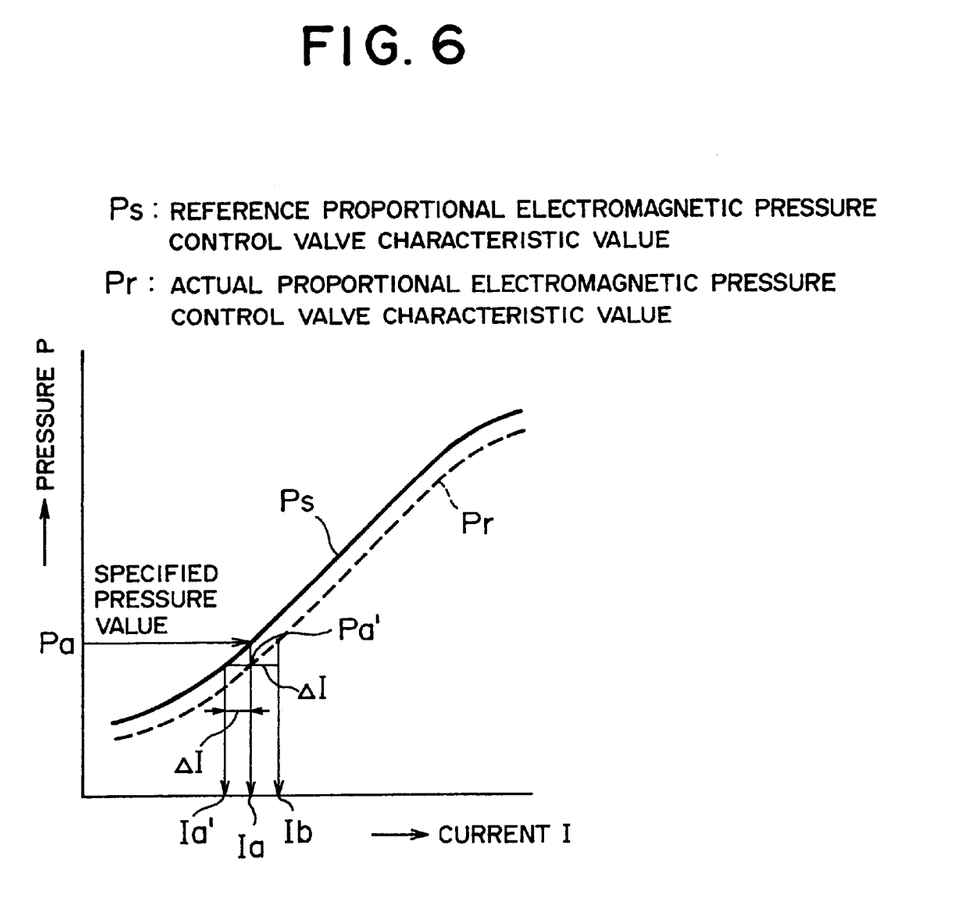
FIG. 6 is a view for explaining another example of method of modifying an operation characteristic of a proportional electromagnetic pressure control valve in accordance with this embodiment.

On the other hand, FIG. 6 is a view for explaining the second example of method of modifying an operation characteristic of the proportional electromagnetic pressure control valve 6 in accordance with this embodiment. Here, it is assumed that reference representative values of the characteristic curve for pressure with respect to the load current level of the proportional electromagnetic pressure control valve 6 (curve referred to as Ps in FIG. 6), which are attached thereto by a maker of the proportional electromagnetic pressure control valve, are prestored in the memory 14 of the control unit 12 as being A/D converted.

Here, when a pressure Pa of the hydraulic circuit is specified from the operation panel 11 to the CPU 13 in order to modify this characteristic curve Ps, the CPU 13 reads out a load current level Ia corresponding to this specified value Pa from the characteristic curve Ps stored in the memory 14, and this Load current level Ia is D/A-converted by the D/A converter 15 and, after being constantly amplified by the amplifier 16, is outputted to the proportional electromagnetic pressure control valve 6.

Then, a pressure Pa' corresponding to this current level Ia is measured by the pressure sensor 9, and thus actually measured value is fed to the CPU 13 after being converted from analog to digital by the A/D converter 17. Here, the actually measured pressure value Pa' is determined according to the technique previously explained with reference to FIG. 1.

The CPU 13 compares the actually measured pressure value Pa' with the reference representative value Pa of the characteristic curve, replaces the actually measured pressure value Pa' with the specified value, reads out a current level Ia' corresponding to the actually measured value Pa' from the reference representative characteristic curve Ps, adds (or subtracts) a difference ΔI between the current level Ia' and the initial load current level Ia to (from) the initial load current level Ia, and replaces a load current level Ib obtained as a result of this arithmetic operation with the load current level of the reference representative characteristic curve Ps, thus rewriting the memory 14.

In this manner, the current level of the characteristic curve Ps with respect to a certain specified value can be modified.

As the foregoing technique is repeated while the magnitude of pressure is changed, the characteristic curve Ps stored in the memory 14 is rewritten into a modified characteristic curve Pr of pressure and current such as that shown in FIG. 6 as dotted line.

When the characteristic curve approximates a line or when the difference ΔI is small, thus modified characteristic curve Pr has a practically sufficient accuracy. Accordingly, the above-mentioned method of modifying an operation characteristic can simply effect modification in the manufacturing site or molding site, thus being quite convenient.

Though the method of modifying an operation characteristic applied to the proportional electromagnetic pressure control valve 6 is explained as an example in the foregoing, a technique similar thereto is applied to the case where the operation characteristic (flow rate-current characteristic) of the proportional electromagnetic flow control valve 5 is to be modified.

Thus, in accordance with this embodiment, upon the shipping inspection at the manufacturing site of the injection molding machine, the pressure-current characteristic of the proportional electromagnetic pressure control valve 6 or velocity-current characteristic of the hydraulic cylinder 1 (flow rate-current characteristic of the proportional electromagnetic flow control valve 5), which becomes a reference for instructing and operating the hydraulic circuit, is automatically inspected and modified in a working manner, whereby the executive value corresponding to the specified value can be correctly reproduced, thus making it possible to yield a correct resolution as fine as about 0.1%.

Also, even when the proportional electromagnetic control valves 5 and 6 built in the hydraulic circuit or functional parts relating to hydraulic pressure and flow rate are repaired or exchanged, characteristics of the proportional electromagnetic control valves 5 and 6 can be automatically modified while the machine is kept installed as it is.

Since the load current level is modified such that the specified value and the executive value coincide with each other and then is stored in the memory 14 so as to be read out when necessary, the points of measurement become less when the specified values are determined beforehand, thus allowing the measurement time to become shorter.

Further, in the pressure measuring technique of this embodiment, even in the case where pressure is relatively low, the pressure obtained when the inclination of the declining curve of rising overshoot upon switching hydraulic pressure becomes a predetermined level or less is employed as a measured value, whereby the measurement time can be shortened. Also, in the velocity measuring technique of this embodiment, since the distance of travel in a predetermined time is measured so as to determine velocity, measurement -ime can be made shorter than that in the conventional case, in particular, on the minimum velocity side. Therefore, even when numerous points are to be measured, time required for measuring an operation characteristic can be greatly reduced.

As explained in the foregoing, in accordance with this embodiment, the actually measured value is automatically modified to the specified value, and the characteristic curves of the proportional electromagnetic control valves 5 and 6 themselves are recomposed and stored in the memory 14. When the actual machine is operated, the operation characteristics can be read out from the memory 14 so as to control the proportional electromagnetic control valves 5 and 6. Also, the shipping inspection can be effected in a short time, whereas the characteristics can be automatically adjusted in a molding factory after the machine is shipped.

Though the above-mentioned embodiment is explained with an example in which the injection cylinder 1 is used; in a proportional electromagnetic pressure control valve for controlling pressure of a closing cylinder, an operation characteristic can also be modified by the same pressure measuring method while the closing cylinder is set to a closed state. Also, in a back-pressure proportional electromagnetic pressure control valve, an operation characteristic can be modified in a method similar to that mentioned above when pressure oil is supplied thereto while the injection cylinder is set to a closed state.

Though the above-mentioned embodiment explains a case where the present invention is applied to a hydraulic circuit for operating various kinds of cylinders (injection cylinder and the like) in the injection molding machine; without being restricted thereto, the present invention is also applicable tc various kinds of apparatus where a hydraulic circuit for operating a hydraulic cylinder is equipped with a proportional electromagnetic control valve, whereby advantageous effects similar to those mentioned above can be obtained.

What is claimed is:

1. A method of correcting operational characteristics of a proportional electromagnetic control valve of a hydraulic circuit, in accordance with an optimum value corresponding to a load current value of the proportional electromagnetic control valve and in a memory in the form of a characteristic curve, to normalize a possible unsatisfactory operation of a hydraulic cylinder of the hydraulic circuit, said method comprising (a) designating an arbitrary hydraulic pressure or flow rate of the hydraulic circuit;

(b) reading out, from the characteristic curve in the memory, an initial electric load current value for the proportional electromagnetic control valve corresponding to a level of said designated pressure or flow rate;

(c) loading said read out initial electric current to the proportional electromagnetic control valve;

(d) measuring an actual pressure or flow rate of the hydraulic circuit corresponding to said loaded electric current;

(e) reading out, from the characteristic curve in the memory, an on-curve electric load current value, for said proportional electromagnetic control valve, corresponding to said measured actual pressure or flow rate value from said characteristic curve in the memory as an electric current value.

(f) calculating a difference between said initial electric load current value readout by the first-named reading and said actual electric load current value read out by the second-named reading;

(g) adding or subtracting said calculated difference to or from said initial load current level to obtain a target electrical load current value; and (h) updating the characteristic curve in the memory to such a characteristic curve that said obtained target electrical load current value is treated as said initial electrical load current value corresponding to said designated pressure or flow rate.

2. A method of measuring an operation characteristic of a proportional electromagnetic control valve, in a hydraulic circuit which actuates a hydraulic cylinder, the control valve being, operable to control a hydraulic pressure and a flow rate based on a load of electrical current for the control valve, said method comprising the steps of:

if the proportional electromagcnetic control valve is a proportional electromagnetic pressure control valve for controlling a pressure of the hydraulic cylinder (a) cutting off a flow of the hydraulic circuit into the cylinder;

(b) successively loading a predetermined series of electrical currents for the proportional electromagnetic pressure control valve;

for each of said loaded electrical currents, (c) measuring a pressure of the hydraulic circuit at regular time intervals;

(d) calculating a difference in pressure between a then-current measured pressure and a preceding measured pressure;

(e) repeating said steps (c) and (d) until such pressure difference becomes smaller than a predetermined reference value; and when said pressure difference becomes smaller than a predetermined reference value, (f) defining said measured hydraulic pressure corresponding to said loaded electrical current as the operation characteristic of said proportional electromagnetic pressure control valve with respect to pressure-electric current.

3. A method of measuring an operation characteristic of a proportional electromagnetic control valve, in a hydraulic circuit which actuates a hydraulic cylinder, the control valve being operable to control a hydraulic pressure and a flow rate based on a load of electrical current for the control valve, said method comprising the steps of if the proportional electromagnetic control valve is a proportional electromagnetic flow control valve for controlling a flow rate of the hydraulic cylinder, (a) successively loading different magnitudes of electrical current for the proportional electromagnetic flow control valve;

for each of said different magnitudes of electrical currents, (b) actuating the hydraulic cylinder by the flow control valve in accordance with said loaded electrical current;

(c) measuring a distance by which a hydraulic ram of the hydraulic cylinder has been moved in a predetermined time as the result of said actuating in step (b);

(d) calculating a velocity of the hydraulic ram of the cylinder using said measured distance; and (e) obtaining a velocity-electric current characteristic of said proportional electromagnetic flow control valve based on said loaded magnitude of electrical current and the calculated velocity of the ram.

4. A method for controlling a hydraulic cylinder which is actuated by a hydraulic circuit, a proportional electromagnetic control valve in the hydraulic circuit being operable to control a hydraulic pressure and a flow rate based on a load of electrical current for the control valve, said method comprising the steps of:

if the proportional electromagnetic control valve is a proportional electromagnetic pressure control valve for controlling a pressure of the hydraulic cylinder, (a) cutting off a flow of the hydraulic circuit into the cylinder, (b) successively loading a predetermined series of electrical currents for the proportional electromagnetic pressure control valve;

for each of said loaded electrical currents.

(c) measuring a pressure of the hydraulic circuit at regular time intervals;

(d) calculating a difference in pressure between the then-current measured pressure and a preceding measured pressure;

(e) repeating said steps (c) and (d) until such pressure difference becomes smaller than a predetermined reference value;

when said pressure difference becomes smaller than a predetermined reference value, (f) defining said measured hydraulic pressure, corresponding to said loaded electrical current, as the operation characteristic of said proportional electromagnetic pressure control valve with respect to pressure-electric current;

(g) storing in a memory said defined pressure-electric current characteristic of said proportional electromagnetic pressure control valve;

in an actual operation of the hydraulic cylinder, (h) designating a target pressure of the hydraulic cylinder, (i) selecting, from said pressure-electric current characteristic stored in the memory, an electric load current corresponding to the target pressure; and (j) loading said selected electric load current to said proportional electromagnetic pressure control valve so as to control said hydraulic cylinder.

5. A method for controlling a hydraulic cylinder which is actuated by a hydraulic circuit, a proportional electromagnetic control valve in the hydraulic circuit being operable to control a hydraulic pressure and a flow rate based on a load of electrical current for the control valve, said method comprising the steps of:

if the proportional electromagnetic control valve is a proportional electromagnetic flow control valve for controlling a flow rate of the hydraulic cylinder, (a) successively loading different magnitudes of electrical current for the proportional electromagnetic flow control valve;

for each of said different magnitudes of electrical currents, (b) actuating the hydraulic cylinder by the flow control valve in accordance with said loaded electrical current;

(c) measuring a distance by which a hydraulic ram of the hydraulic cylinder has been moved in a predetermined time as the result of said actuating time in step (b);

(d) calculating a velocity of the hydraulic ram of the cylinder based on said measured distance;

(e) obtaining a velocity-electric current characteristic of said proportional electromagnetic flow control valve based on said magnitude of electrical current and the calculated velocity of the ram;

(f) storing in a memory said obtained velocity-electric current characteristic of said proportional electromagnetic flow control valve;

in an actual operation of the hydraulic cylinder, (g) designating a target velocity of the hydraulic ram;

(h) selecting, from said velocity-electric current characteristic stored in the memory, an electric load current corresponding to the desired velocity; and (i) loading said selected electric load current to said proportional electromagnetic flow control valve so as to control said hydraulic cylinder.

6. A method for controlling a hydraulic cylinder which is actuated by a hydraulic circuit, a proportional electric control valve in the hydraulic circuit being operable to control a hydraulic pressure and a flow rate based on a load of electrical current for the control valve, said method comprising the steps of:

if the proportional electromagnetic control valve is a proportional electuomagnietic pressure control valve for controlling a pressure of the hydraulic cylinder, (a) cutting off a flow of the hydraulic circuit into the cylinder, (b) successively loading a predetermined series of electrical currents lor the proportional electromagnetic pressure control valve;

for each of said loaded electrical currents, (c) measuring a pressure of the hydraulic circuit at regular time intervals;

(d) calculating a difference in pressure between the then-current measured pressure and a preceding measured pressure;

(e) repeating said steps (c) and (d) until such pressure difference becomes smaller than a predetermined reference value;

when said pressure difference becomes smaller than a predetermined reference value;

(f) defining said measured hydraulic pressure, corresponding to said loaded electrical current, as the operation characteristic of said proportional electromagnetic pressure control valve with respect to pressure-electric current;

(g) creating a table of said defined operation characteristic of pressure-electric current;

(h) calculating a function based on said created table;

(i) storing in a memory said function calculated in said step (g);

in an actual operation of the hydraulic cylinder, (j) reading said stored function;

(k) calculating, based on said read function, an electric current corresponding to a given target pressure value; and (l) loading said electric current, which is calculated in said step (j), to said proportional electromagnetic pressure control valve so as to control said hydraulic cylinder.

7. A method for controlling a hydraulic cylinder which is actuated by a hydraulic circuit, a proportional electromagnetic control valve in the hydraulic circuit being operable to control a hydraulic pressure and a flow rate based on a load of electrical current for the control valve, said method comprising the steps of:

if the proportional electromagnetic control valve is a proportional electromagnetic flow control valve for controlling a flow rate of the hydraulic cylinder, (a) successively loading different magnitudes of electrical current for the proportional electromagnetic flow control valve;

for each of said different magnitudes of electrical current, (b) actuating the hydraulic cylinder by the flow control valve in accordance with said loaded electrical current;

(c) measuring a distance by which a hydraulic ram of the hydraulic cylinder has been moved in a predetermined time as the result of said actuating in step (b);

(d) calculating a velocity of the hydraulic ram of the cylinder based on said measured distance; and (e) obtaining a velocity-electric characteristic of said proportional electromagnetic flow control valve based on said loaded magnitude of electrical current and the calculated velocity of the ram;

(f) creating a table of said obtained velocity-electric current characteristic;

(g) calculating a function based on the table created in step (f);

(h) storing in a memory said function calculated in step (g);

in an actual operation of the hydraulic cylinder, (i) reading said stored function;

(j) calculating, based on said read function, an electric current corresponding to a given target velocity value of the hydraulic ram; and (k) loading said electric current, which is calculated in said step (j), to said proportional electromagnetic flow control valve so as to control said hydraulic cylinder.

\* \* \* \* \*